United States Patent
Tomiyama et al.

(10) Patent No.: US 11,392,785 B2
(45) Date of Patent: Jul. 19, 2022

(54) CONTROL DEVICE AND IMAGE FORMING APPARATUS

(71) Applicant: TOSHIBA TEC KABUSHIKI KAISHA, Tokyo (JP)

(72) Inventors: Takashi Tomiyama, Sunto Shizuoka (JP); Sadatoshi Oishi, Fuji Shizuoka (JP); Yuki Koike, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/318,717

(22) Filed: May 12, 2021

(65) Prior Publication Data

US 2022/0019751 A1 Jan. 20, 2022

(30) Foreign Application Priority Data

Jul. 16, 2020 (JP) .............................. JP2020-122406

(51) Int. Cl.
*G06K 7/10* (2006.01)
*H04N 1/00* (2006.01)

(52) U.S. Cl.
CPC ..... *G06K 7/10366* (2013.01); *G06K 7/10099* (2013.01); *H04N 1/00342* (2013.01)

(58) Field of Classification Search
CPC .......... G06K 7/10366; G06K 7/10099; H04N 1/00342; H04N 1/00721; H04N 1/0057; H01Q 1/38
See application file for complete search history.

(56) References Cited

U.S. PATENT DOCUMENTS

| | | | |
|---|---|---|---|
| 2006/0171753 A1* | 8/2006 | Fessler | B41J 11/44 400/76 |
| 2014/0167920 A1 | 6/2014 | Kamiya | |
| 2018/0165487 A1* | 6/2018 | Hori | G06K 7/10316 |

* cited by examiner

*Primary Examiner* — Vernal U Brown
(74) *Attorney, Agent, or Firm* — Kim & Stewart LLP

(57) ABSTRACT

According to an embodiment, a control device for an image forming apparatus includes a controller that acquires reference information corresponding to expected signal strength values from a wireless tag on a sheet moving along a conveyance path and also acquires measured signal strength values for a first wireless tag on a sheet from a wireless tag communication device. The controller calculates a similarity value from the measured signal strength values and the expected signal strength values to determine whether the first wireless tag is on a sheet moving along the conveyance path. The controller controls the wireless tag communication device to write information to the first wireless tag when the calculated similarity value is above a threshold similarity value.

19 Claims, 18 Drawing Sheets

FIG. 7

| index | Time (ms) | RSSI (dBm) |
|---|---|---|
| 0 | 40 | -60 |
| 1 | 94 | -60 |
| 2 | 124 | -55 |
| 3 | 184 | -48 |
| 4 | 214 | -44 |
| 5 | 264 | -40 |
| 6 | 304 | -38 |
| 7 | 364 | -36 |
| 8 | 404 | -36 |

FIG. 9

| index | Tag ID | Time (ms) | RSSI (dBm) |
|---|---|---|---|
| 0 | AAAABBBB0001 | 19 | -57 |
| 1 | AAAABBBB0001 | 69 | -58 |
| 2 | CCCCDDDD0002 | 114 | -57 |
| 3 | AAAABBBB0001 | 118 | -60 |
| 4 | CCCCDDDD0002 | 173 | -58 |
| 5 | AAAABBBB0001 | 176 | -58 |
| 6 | CCCCDDDD0002 | 221 | -52 |
| 7 | AAAABBBB0001 | 226 | -55 |
| 8 | CCCCDDDD0002 | 281 | -45 |
| 9 | CCCCDDDD0002 | 321 | -42 |
| 10 | AAAABBBB0001 | 327 | -58 |
| 11 | AAAABBBB0001 | 363 | -60 |
| 12 | CCCCDDDD0002 | 368 | -38 |
| 13 | AAAABBBB0001 | 428 | -60 |
| 14 | CCCCDDDD0002 | 434 | -40 |

FIG. 10

| | Tag X | | |
|---|---|---|---|
| index | Tag ID | Time (ms) | RSSI (dBm) |
| 0 | AAAABBBB0001 | 19 | -57 |
| 1 | AAAABBBB0001 | 69 | -58 |
| 2 | AAAABBBB0001 | 118 | -60 |
| 3 | AAAABBBB0001 | 176 | -58 |
| 4 | AAAABBBB0001 | 226 | -55 |
| 5 | AAAABBBB0001 | 327 | -58 |
| 6 | AAAABBBB0001 | 363 | -60 |
| 7 | AAAABBBB0001 | 448 | -60 |

FIG. 11

| Tag Y | | | |
|---|---|---|---|
| Index | Tag ID | Time (ms) | RSSI (dBm) |
| 0 | CCCCDDDD0002 | 114 | -57 |
| 1 | CCCCDDDD0002 | 173 | -58 |
| 2 | CCCCDDDD0002 | 221 | -52 |
| 3 | CCCCDDDD0002 | 281 | -45 |
| 4 | CCCCDDDD0002 | 321 | -42 |
| 5 | CCCCDDDD0002 | 368 | -38 |
| 6 | CCCCDDDD0002 | 454 | -40 |

FIG. 12

| Reference pattern | Tag X | Tag Y |
|---|---|---|
| -60 | -57 | -57 |
| -60 | -58 | -58 |
| -55 | -60 | -52 |
| -48 | -58 | -45 |
| -44 | -55 | -42 |

FIG. 13

|  | Tag X | Tag Y |
|---|---|---|
| Correlation coefficient | 0.47 | 1.00 | ized
CONTROL DEVICE AND IMAGE FORMING APPARATUS

CROSS-REFERENCE TO RELATED APPLICATIONS

This application is based upon and claims the benefit of priority from Japanese Patent Application No. 2020-122406, filed on Jul. 16, 2020, the entire contents of which are incorporated herein by reference.

FIELD

Embodiments described herein relate generally to a control device and an image forming apparatus.

BACKGROUND

There is an image forming apparatus capable of forming an image on a sheet provided with a wireless tag. Such an image forming apparatus includes a wireless tag communication device capable of writing information or data to the wireless tag. The image forming apparatus has a sheet storage unit on which a sheet with a wireless tag can be placed. Examples of the sheet storage unit include a sheet feeding cassette and a manual feeding tray.

The wireless tag communication device may write information to a wireless tag on a sheet while the sheet is being conveyed from the sheet storage unit through the image forming apparatus. The wireless tag communication device, however, may sometimes erroneously write data to a wireless tag that is on a sheet that is still on, or in, the sheet feeding cassette or the manual feeding tray instead of the correct target wireless tag.

Hence, there is a need for a control device and an image forming apparatus capable of correctly identifying a target wireless tag for data writing and preventing data from being erroneously written to a non-target wireless tag.

BRIEF DESCRIPTION OF THE DRAWINGS

FIG. 7 shows an example of sampled RSSIs according to an embodiment.

FIG. 9 shows an example of sampling data.

FIG. 10 shows an example of collected sampling data.

FIG. 11 shows an example of collected sampling data.

FIG. 12 shows five pieces of collected sampling data.

FIG. 13 shows an example of correlation coefficients.

DETAILED DESCRIPTION

Figure 1:
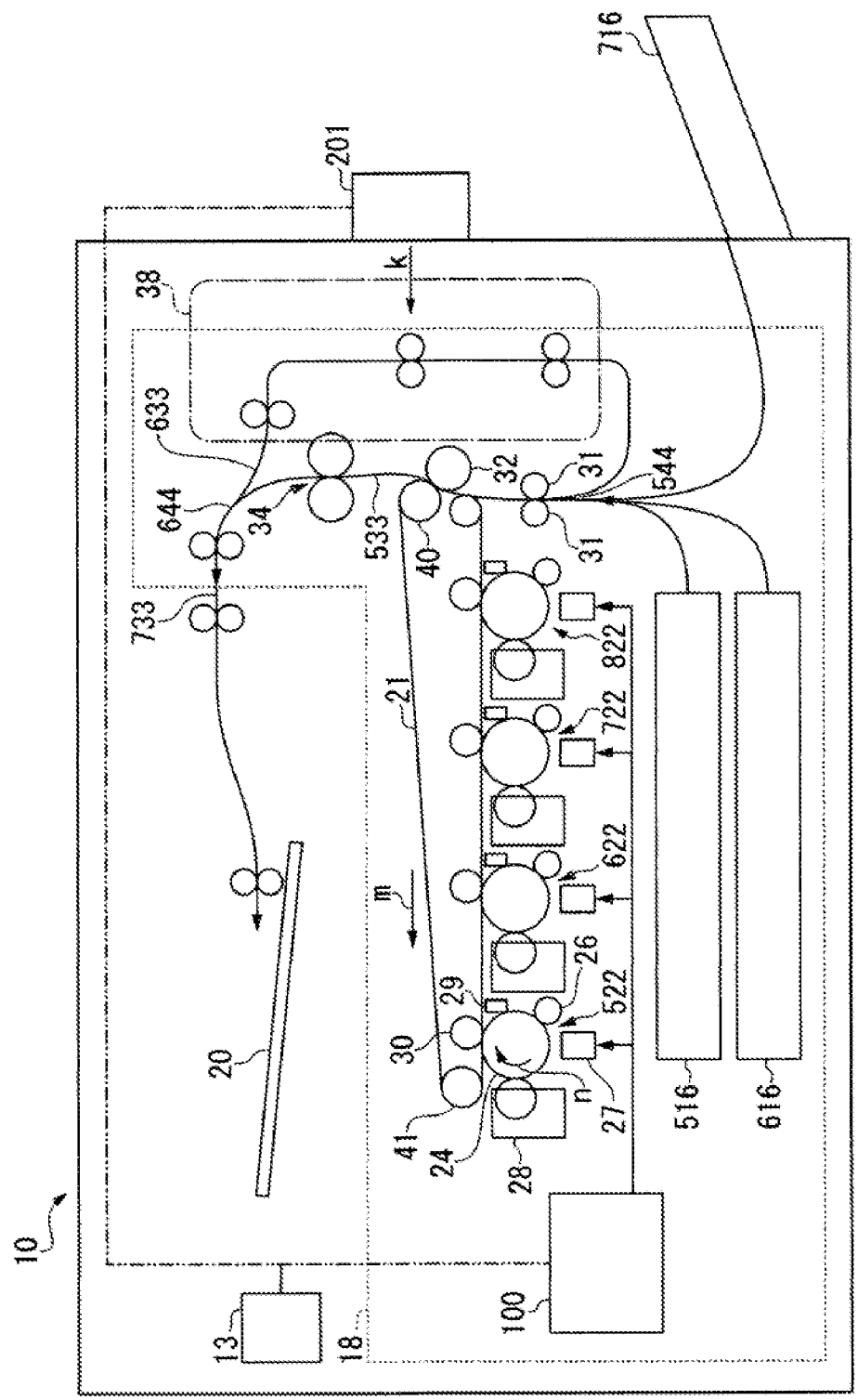
FIG. 1 depicts an image forming apparatus according to an embodiment.

According to an embodiment, a control device for an image forming apparatus includes a controller. The controller is configured to acquire reference information corresponding to expected signal strength values for a wireless tag on a sheet moving along a conveyance path. The controller also acquires, from a wireless tag communication device, measured signal strength values for a first wireless tag on a sheet. The controller then calculates a similarity value for the measured signal strength values and the expected signal strength values to determine whether the first wireless tag is on a sheet moving along the conveyance path. Then the controller controls the wireless tag communication device to write information to the first wireless tag when the calculated similarity value is above a threshold similarity value.

Hereinafter, an image forming apparatus according to certain example embodiments will be described with reference to the accompanying drawings. Configurations having the same or substantially similar functions are denoted by the same reference numerals. Descriptions of the same or substantially similar configurational aspects may be omitted.

FIG. 1 depicts an example configuration of an image forming apparatus 10 according to one embodiment.

In FIG. 1, the image forming apparatus 10 includes a control panel 13, a wireless tag communication device 201, and a printer unit 18. The printer unit 18 includes a control unit (or a controller) 100 and sheet feeding cassettes 516 and 616. The control unit 100 controls the control panel 13, the wireless tag communication device 201, and the printer unit 18. The control unit 100 controls conveyance of a sheet in the printer unit 18. The control of the conveyance of the sheet may include control of the conveyance timing for the sheet, the stop position for the sheet during the conveyance, the conveyance speed of the sheet, or the like.

The control panel 13 includes input keys and a display unit. For example, the input key accepts an input by a user of the image forming apparatus 10. For example, the display unit is a touch panel type. The display unit receives an input from a user and displays information to the user. For example, the control panel 13 displays items of information related to parameters of or options associated with an operation of the image forming apparatus 10 that can be set or selected by a user. The control panel 13 notifies the control unit 100 of the parameters set and selections made by the user.

The sheet feeding cassettes 516 and 616 store sheets that have wireless tags attached to or embedded therein. The sheet feeding cassettes 516 and 616 can also store regular sheets lacking a wireless tag. In the present embodiment, unless otherwise specified, a sheet with a wireless tag is being used. The sheet is made of, for example, a material such as paper, a plastic film, or the like.

The printer unit 18 performs an image forming operation. For example, the printer unit 18 forms an image on a sheet based on image data. In the present embodiment, forming an image on a sheet is also referred to as printing. The printer unit 18 includes an intermediate transfer belt 21. The intermediate transfer belt 21 is supported by a driven roller 41, a backup roller 40, and the like in the printer unit 18. The printer unit 18 rotates the intermediate transfer belt 21 in the arrow "m" direction.

The printer unit 18 includes a set of four image forming units 522, 622, 722, and 822 (also referred to as image forming stations). The image forming units 522, 622, 722, and 822 are used for forming Y (yellow), M (magenta), C (cyan), and K (black) images, respectively. The image forming units 522, 622, 722, and 822 are disposed below the intermediate transfer belt 21 and arranged in series along a rotation direction of the intermediate transfer belt 21.

The image forming unit 522 (for Y (yellow)) will be described as an example. Since the image forming units 622, 722, and 822 each have the same configuration as the image forming unit 522, descriptions of the image forming unit 522 also apply to the other image forming units.

The image forming unit 522 includes an electrostatic charger 26, an exposure scanning head 27, a developing device 28, and a photoreceptor cleaner 29. The electrostatic charger 26, the exposure scanning head 27, the developing device 28, and the photoreceptor cleaner 29 are arranged around a photoreceptor drum 24 that rotates in the arrow "n" direction.

The image forming unit 522 also includes a primary transfer roller 30. The primary transfer roller 30 faces the photoreceptor drum 24 via the intermediate transfer belt 21.

In the image forming unit 522, the photoreceptor drum 24 is electrostatically charged by the electrostatic charger 26 and then selectively exposed by the exposure scanning head 27 according to image data or the like to be printed. An electrostatic latent image is formed on the photosensitive drum 24 by the selective exposure. The developing device 28 then develops the electrostatic latent image on the photoreceptor drum 24 using a two-component developer formed by toner and carrier.

The primary transfer roller 30 transfers the toner image formed on the photoreceptor drum 24 to the intermediate transfer belt 21. The image forming units 522, 622, 722, and 822 each form toner images on the intermediate transfer belt 21 by respective primary transfer rollers 30. A full color toner image is formed by sequentially superimposing (stacking) toner images of Y (yellow), M (magenta), C (cyan), and K (black). The photoreceptor cleaner 29 removes toner remaining on the photoreceptor drum 24 after the transfer at the primary transfer roller 30.

The printer unit 18 includes a secondary transfer roller 32. The secondary transfer roller 32 faces the backup roller 40 via the intermediate transfer belt 21. The secondary transfer roller transfers the stacked toner images on the intermediate transfer belt 21 to the sheet. A "toner image" in this context may be either a multiple color toner image stacked on each other or a single color toner image. In some examples, a toner image may be formed using a decolorable toner.

A conveyance path 533 extends from a confluence portion 544 to a branch portion 644. The conveyance path 533 is an example of a conveyance unit. A conveyance path 633 passes through the inside of a duplex printing device 38 and extends from the branch portion 644 to the confluence portion 544. A conveyance path 733 extends from the branch portion 644 to a discharge tray 20.

A front end (leading edge) of the sheet taken out from the sheet feeding cassette 516, the sheet feeding cassette 616, or a manual feeding tray 716 is brought into contact with the two registration rollers 31, while the registration rollers are in a nonmoving state and in contact with each other. An angle or skew of the sheet is corrected at the registration rollers 31 by this process. The control unit 100 starts rotation of the registration rollers 31 in accordance with the position of the toner image on the intermediate transfer belt 21 to move the sheet to the position of the secondary transfer roller 32 at the appropriate time to receive the toner image. The control unit 100 causes the secondary transfer roller 32 to transfer the toner image from the intermediate transfer belt 21 onto the sheet. The control unit 100 causes the sheet to the conveyance path 533 and controls a fixing device 34 to fix the toner image on the sheet. The control unit 100 causes the sheet to be conveyed along the conveyance path 733 and discharged onto the discharge tray 20.

In the case of double-sided (or duplex) printing, the control unit 100 also causes a sheet having an image formed on its front surface to be conveyed along the conveyance path 733. But after the entire sheet has passed through the branch portion 644, the control unit 100 causes the sheet to be conveyed back along the conveyance path 633 (e.g., switch back). Thereafter, the control unit 100 causes the sheet to proceed to the confluence portion 544 along the conveyance path in the duplex printing device 38, and then again be conveyed along the conveyance path 533 via the registration rollers 31. Then, the control unit 100 controls the fixing device 34 to fix the toner image on a back surface of the sheet. The control unit 100 causes the sheet having the image formed on the back surface to be conveyed along the conveyance path 733 and discharged onto the discharge tray 20.

The wireless tag communication device 201 includes a processor and a storage device. The wireless tag communication device 201 can communicate with the control unit 100. The wireless tag communication device 201 communicates with the wireless tag of the sheet to read information from the wireless tag or write information to the wireless tag. In one embodiment, the wireless tag is a Radio Frequency Identifier (RFID) tag. The wireless tag communication device 201 transmits radio waves in the arrow "k" direction. The wireless tag communication device 201 detects a received power strength of the radio wave received from the wireless tag and transmits the detected received power strength and the detection time to the control unit 100. In one embodiment, the received power strength is represented by a received signal strength indicator (RSSI). In the following description, the phrase "RSSI of a wireless tag" refers to the RSSI of the radio wave transmitted from the wireless tag of a sheet as received by the wireless tag communication device 201. The phrase "RSSI of a sheet" also refers to the RSSI of the radio wave transmitted from the wireless tag provided on a sheet. The detection time is, for example, the length of time elapsed from the start of a detection operation or the like.

In the printer unit 18, an electrostatic latent image is formed on the photoreceptor drum 24 by the exposure scanning head 27 before the secondary transfer is performed by the secondary transfer roller 32. The electrostatic latent image formed on the photoreceptor drum 24 is developed then transferred to the intermediate transfer belt 21 as a toner image. The toner image transferred to the intermediate transfer belt 21 is then transferred to a sheet that has been conveyed to the registration rollers 31 then to the secondary transfer roller 32.

Figure 2:
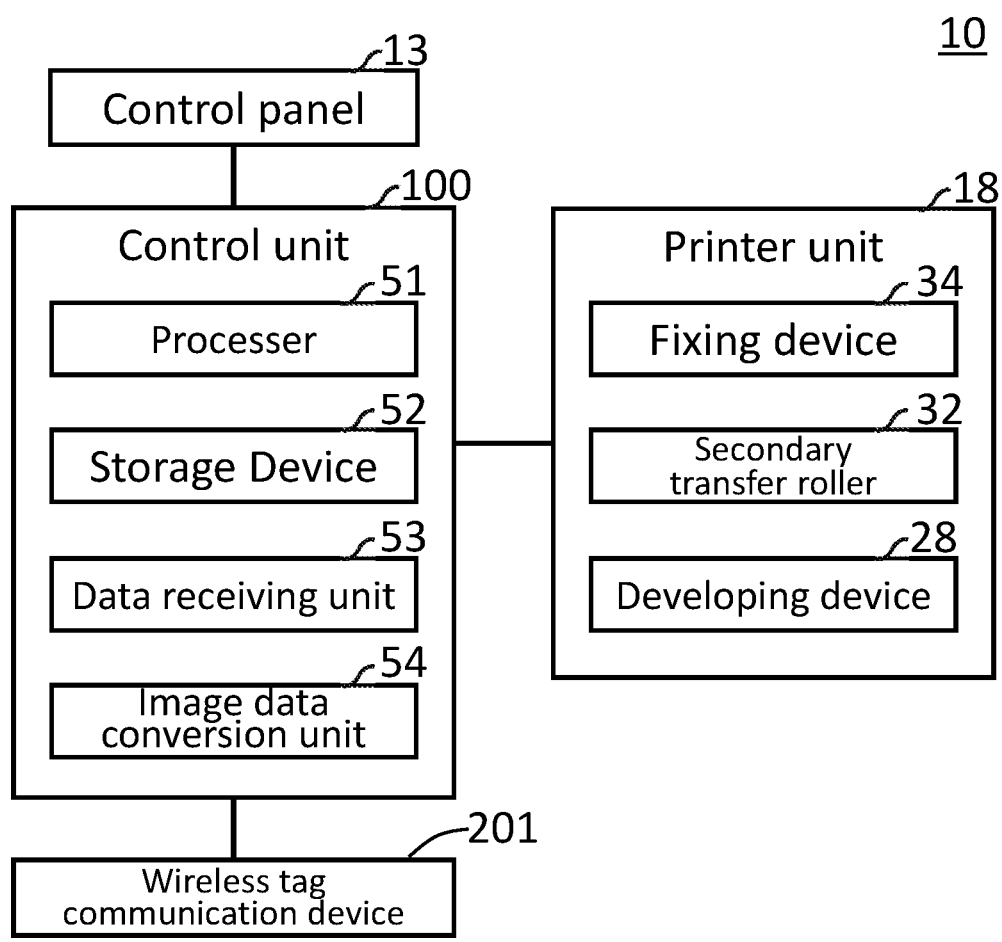
FIG. 2 is a block diagram of an image forming apparatus according to an embodiment.

FIG. 2 is an example block diagram of the image forming apparatus 10 including the control unit 100, the control panel 13, the printer unit 18, and the wireless tag communication device 201.

The control unit 100 includes a processor 51, a storage device 52, a data receiving unit 53, and an image data conversion unit 54. The processor 51 controls the control panel 13, the printer unit 18 and the wireless tag communication device 201 according to an image control program stored in the storage device 52.

The processor 51 is, for example, a central processing unit (CPU) or an application specific integrated circuit (ASIC). The storage device 52 is a read-only memory (ROM), a random-access memory (RAM), a hard disk drive (HDD), a solid-state drive (SDD), or the like. The data receiving unit 53 receives print data (for example, data storage described in a page description language) indicating an image to be printed from a host such as a personal computer (PC). The received print data is stored in the storage device 52. The image data conversion unit 54 determines print conditions based on the print data which has been stored in the storage device 52 by the data receiving unit 53, converts the print data into a printable data format (for example, raster data) that can be printed by the printer unit 18, and stores the converted data in the storage device 52. The data receiving unit 53 can receive a reference pattern from an external device such as a PC or the like and store the received reference pattern in the storage device 52.

The control unit 100 is communicably connected to the printer unit 18. The printer unit 18 includes the fixing device 34, the secondary transfer roller 32, and the developing device 28. The printer unit 18 forms an image on a sheet based on the data converted by the image data conversion unit 54 and then stored in the storage device 52.

Figure 3:
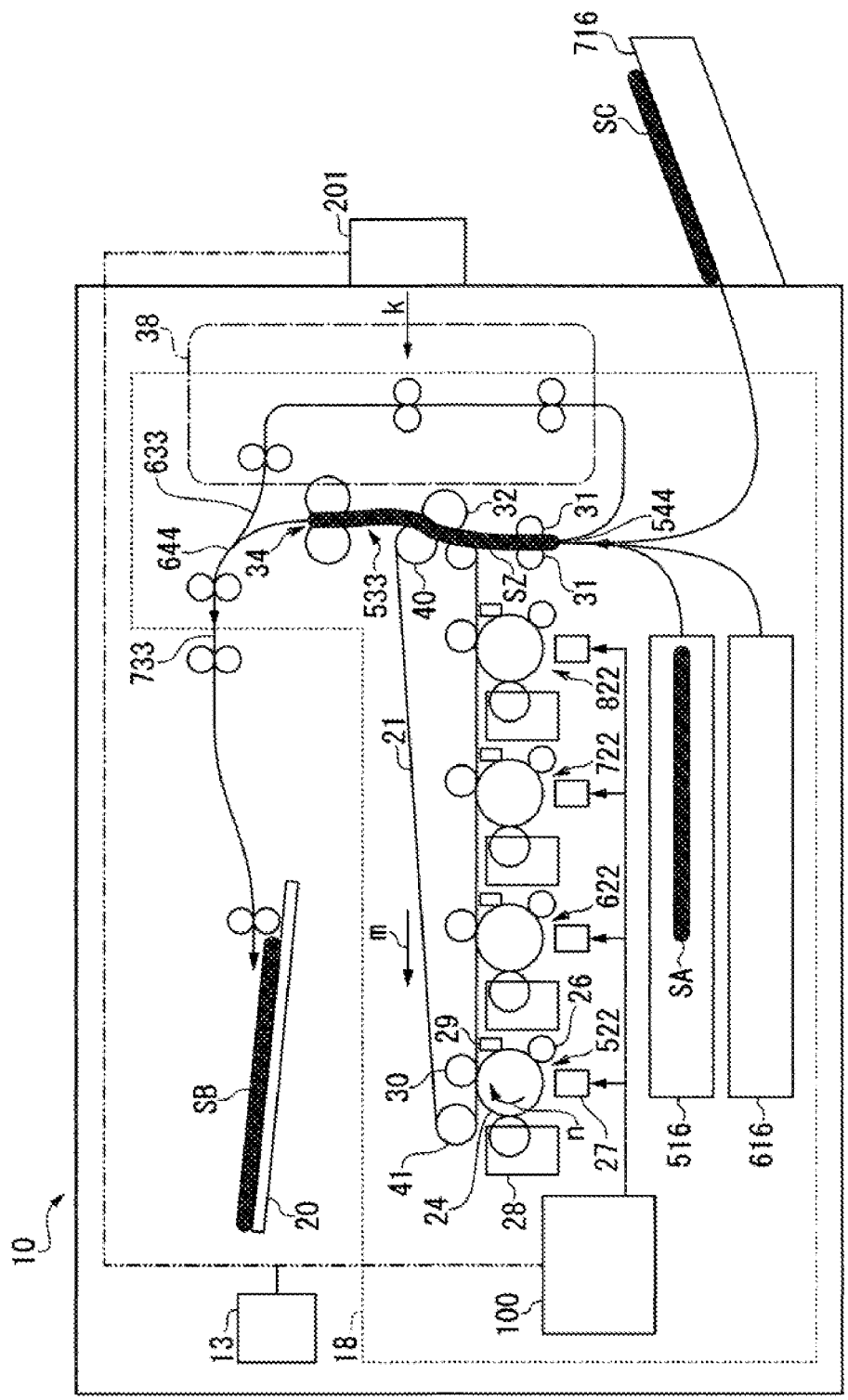
FIG. 3 depicts an image forming apparatus according to an embodiment.

FIG. 3 shows various positions where sheets can be present in the image forming apparatus 10. In FIG. 3, a sheet SA is a sheet in the sheet feeding cassette 516. A sheet SB is a sheet on the discharge tray 20. A sheet SC is a sheet on the manual feeding tray 716. The sheet feeding cassettes 516 and 616, the sheet discharge tray 20, and the manual feeding tray 716 are examples of the sheet storage unit.

Figure 4:
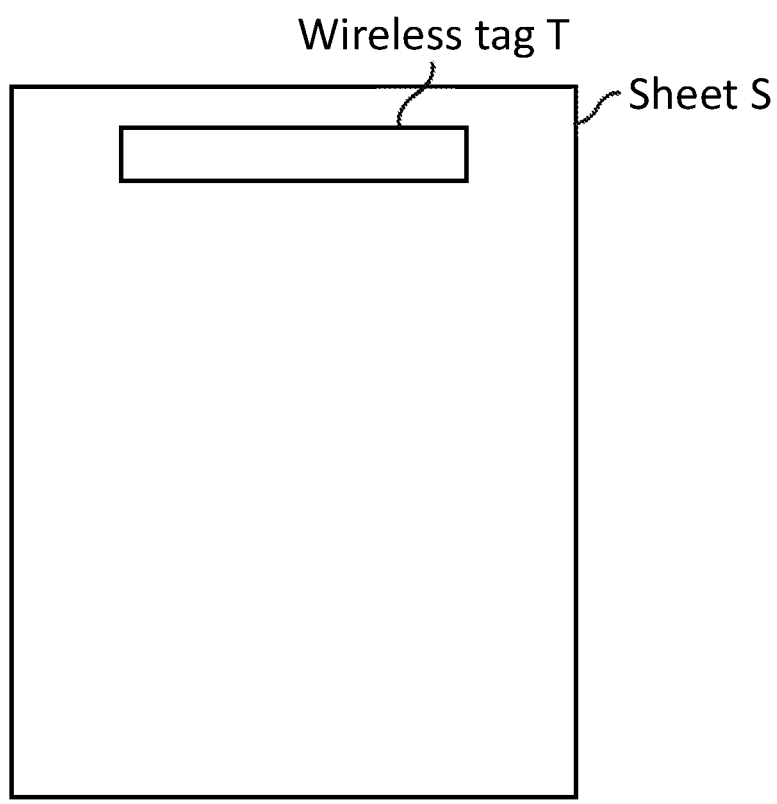
FIG. 4 depicts an example position of a wireless tag on a sheet according to an embodiment.

A sheet SZ is a sheet being conveyed along the conveyance path 533. Each sheet SA, SB, SC, SZ has a wireless tag. The wireless tags provided on the sheets SZ, SA, SB, and SC are referred to as wireless tags TZ, TA, TB, and TC, respectively. The position of the wireless tag on each sheet is not particularly limited. For example, as shown in FIG. 4, the wireless tag T may be provided in a region parallel to the short side direction of the sheet S.

A target sheet, or a sheet on which information or data is to be written, is conveyed along the conveyance path 533.

In FIG. 3, the wireless tag communication device 201 transmits a radio wave (or radio waves) in the "k" direction. Each wireless tag that has received the radio wave returns a response radio wave to the wireless tag communication device 201. The wireless tag communication device 201 receives the response radio wave from the wireless tag of each sheet. The RSSI of each wireless tag differs depending on the position of wireless tag relative to the wireless tag communication device 201, the directivity of the radio waves, and the like.

Since the sheets SA, SB, and SC are not presently being conveyed (stationary), the RSSI of each of the wireless tags TA, TB, and TC does not change significantly. On the other hand, the sheet SZ is being conveyed, and the RSSI of the wireless tag TZ greatly changes as compared with the RSSI of each of the wireless tags TA, TB, and TC.

Figure 5:
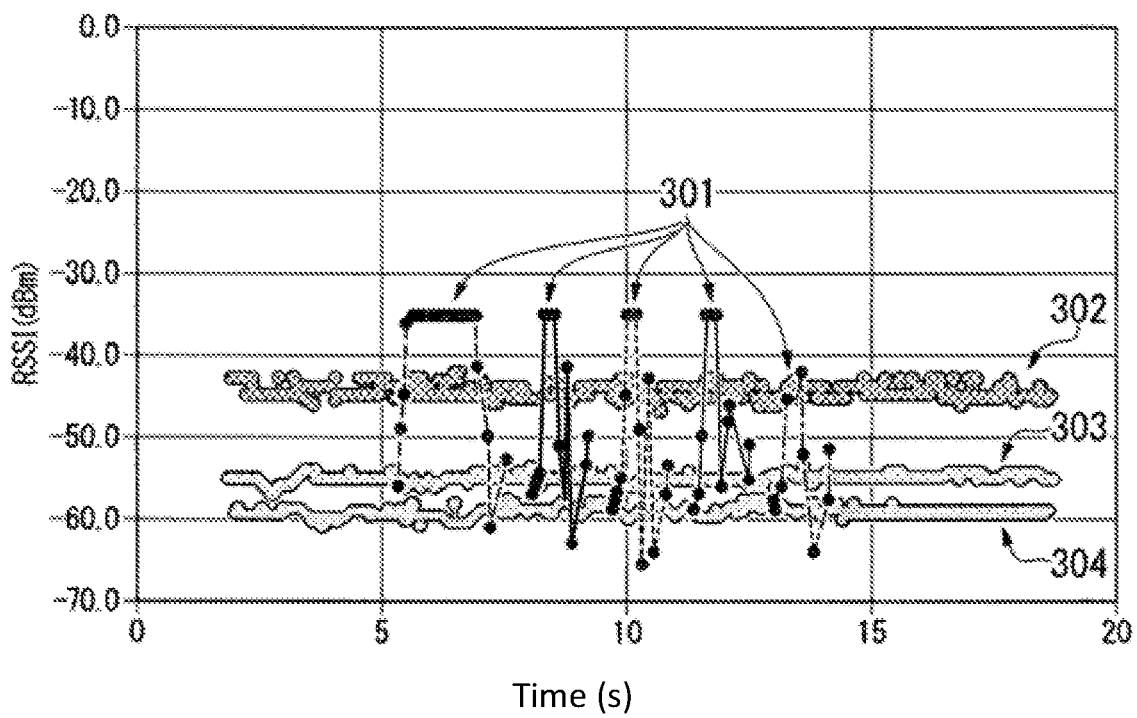
FIG. 5 is a graph showing an example of change in RSSI according to an embodiment.

FIG. 5 shows an example of a change in RSSI. Specifically, FIG. 5 shows the RSSIs detected over time when image formation is being performed on five sheets in a row while the other sheets on/at the sheet feeding cassettes 516 and 616 and the sheet discharge tray 20.

In the graph shown in FIG. 5, the vertical axis represents RSSI (unit: dBm), and the horizontal axis represents time (unit: second). The detected RSSIs are plotted and connected forming graph lines 301, 302, 303, and 304 as RSSI plots. In the example, the graph line 301 significantly changes up and down, and the graph lines 302, 303, and 304 substantially remain flat.

The graph line 301 contains five portions corresponding to the RSSIs detected from the five sheets passed through the conveyance path 533. The graph line 302 indicates the RSSI detected from a sheet on the manual feeding tray 716. The graph line 303 indicates the RSSI detected from a sheet on the sheet feeding cassette 516. The graph line 304 indicates the RSSI detected from a sheet on the sheet feeding cassette 616. The RSSI detected from each of the five sheets passing through the conveyance path 533 may be referred to as a conveyance RSSI or a conveyance-related RSSI. The RSSI detected from each of the sheets that remain placed on the manual feeding tray 716 and the sheet feeding cassettes 516 and 616 may be referred to as a fixed placement RSSI.

As shown in FIG. 5, the fixed placement RSSIs and the conveyance RSSIs are noticeably different. The conveyance RSSI shows a change pattern that significantly rises and falls as a sheet passes through the conveyance path 533 while each of the fixed placement RSSIs shows less substantial changes over the sampling time. Therefore, in the present embodiment, the change pattern of each of the fixed placement RSSIs is stored in the storage device 52 as a reference pattern in advance. The reference pattern is an example of reference information serving as a reference for identifying a target wireless tag to which the wireless tag communication device 201 writes information. The control unit 100 derives a degree of similarity (a similarity value) between the stored reference pattern and the detected RSSI in order to identify the target wireless tag. The control unit 100 then controls the wireless tag communication device 201 to write data to the identified target wireless tag.

Figure 6:
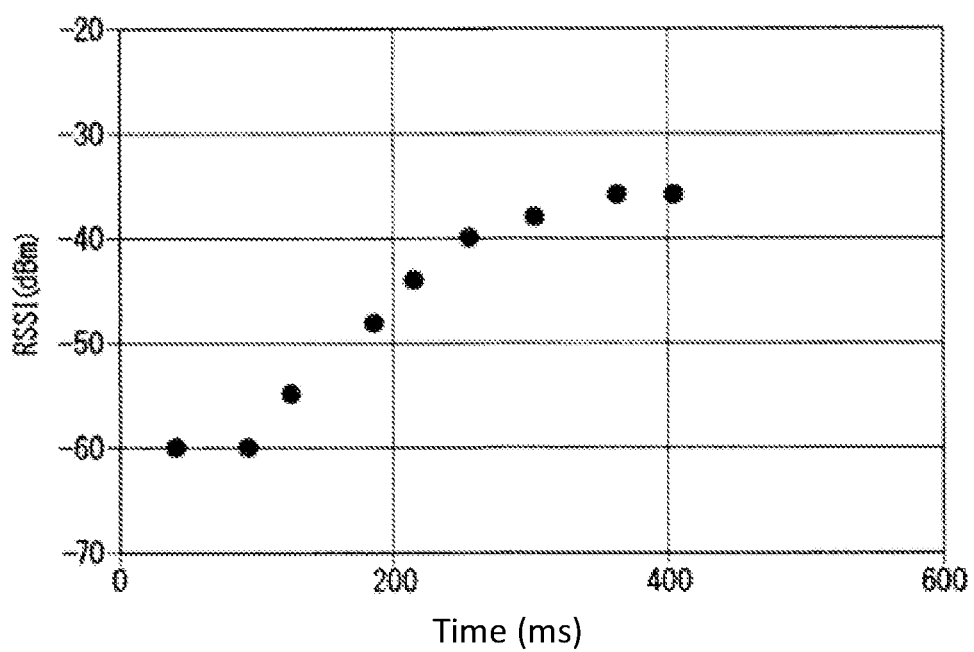
FIG. 6 is a graph showing an example of sampled RSSIs according to an embodiment.

In order to acquire the reference pattern(s), the control unit 100 acquires RSSIs from the wireless tag communication device 201 when a sheet is being conveyed. FIG. 6 shows an example of the sampled RSSIs. In FIG. 6, the vertical axis represents RSSI (unit: dBm), and the horizontal axis represents time (unit: millisecond). In the example, nine sampled RSSI values are plotted.

FIG. 7 shows numerical values of the nine sampled RSSIs at the corresponding sampling time. The data have indexes 0 to 8 assigned, respectively, for managing the data as an array in chronological order.

The control unit 100 stores, for example, five pieces of data having indexes 0 to 4 as the reference patterns in the storage device 52 in advance. For example, the RSSIs with indexes to 4 are assigned to arrays d0, d1, d2, d3, and d4, respectively. In the example of FIG. 7, d0=−60, d1=−60, d2=−55, d3=−48, and d4=−44. The data may be stored as an array structure having the time and the RSSIs as array members. The control unit 100 may receive the reference patterns from an external device such as a PC or the like via the data receiving unit 53 in advance and store the received reference patterns in the storage device 52.

Figure 8:
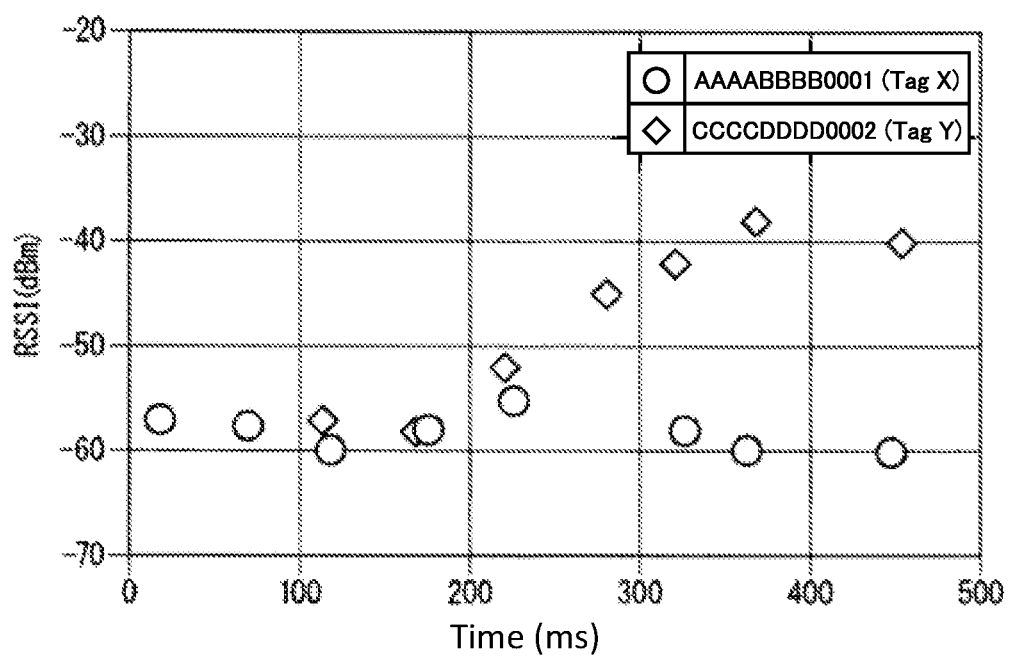
FIG. 8 is a graph showing an example of detected RSSIs.

The control unit 100 acquires the sampled RSSIs from the wireless tag communication device 201. FIG. 8 is a graph plotting RSSIs detected by the wireless tag communication device 201 during a printing operation. In FIG. 8, the vertical axis represents RSSI (unit: dBm), and the horizontal axis represents time (unit: millisecond). As an example, the RSSIs detected from two different wireless tags are shown. The reference labels "AAAABBBB0001" and "CCCCDDDD0002" indicate tag IDs of two different wireless tags. The tag ID uniquely identifies the corresponding wireless tag. The wireless tag whose tag ID is "AAAABBBB0001" is represented as "Tag X," and the wireless tag whose tag ID is "CCCCDDDD0002" is represented as "Tag Y." As shown in FIG. 8, the RSSI of Tag X remains substantially flat, but the RSSI of Tag Y increases from around 200 ms and shows a substantial change.

FIG. 9 shows data including RSSIs detected from Tags X and Y (referred to as "sampling data" herein). Each sampling data has a tag ID, time (in millisecond), and RSSI (in dBm) paired to each other. The respective sampling data are assigned indexes 0 to 14 for managing the data as an array in chronological order.

The control unit 100 collects the acquired sampling data for each of Tags X and Y. FIGS. 10 and 11 show the sampling data collected for Tags X and Y, respectively. As shown in FIGS. 10 and 11, indexes are newly assigned to the sampling data of Tags X and Y.

The control unit 100 derives the degree of similarity using the collected sampling data of each of Tags X and Y and the reference patterns saved in the storage device 52 of the control unit 100 (see FIG. 7). In the example, since the saved reference patterns include the five pieces of data having the indexes 0 to 4 as shown in FIG. 7, five pieces of the collected sampling data having the indexes 0 to 4 as shown in FIGS. 10 and 11 are used as the sampling data for the derivation process of the similarity degree.

FIG. 12 shows the reference patterns having the indexes 0 to 4 (see FIG. 7) and the five pieces of the sampling data having the indexes 0 to 4 of Tags X and Y. The control unit 100 derives the degree of similarity between the reference patterns and the RSSIs of Tag X and the degree of similarity between the reference patterns and the RSSIs of Tag Y. As an example of the degree of similarity, a correlation coefficient is used. The control unit 100 derives the correlation coefficient between the reference patterns and the RSSIs of Tag X and the correlation coefficient between the reference patterns and the RSSIs of Tag Y.

First, a variable "k" is defined as an index (counting) value. The reference pattern is set as series of values D [k]. The RSSI pattern of Tag X is set as a series of values X [k]. The RSSI pattern of Tag Y is set as a series of values Y [k]. The standard deviation of D [k] is a value SD. The standard deviation of X [k] is a value SX. The standard deviation of Y [k] is a value SY. Further, the covariance of D [k] and X [k] is a value SDX. The covariance of D [k] and Y [k] is a value SDY.

The correlation coefficient Rx between the reference pattern and the RSSI of Tag X is as follows:

$$Rx=SDX/(SD \times SX)$$

Similarly, the correlation coefficient Ry between the reference pattern and the RSSI of the tag Y is as follows:

$$Ry=SDY/(SD \times SY)$$

The control unit 100 calculates these correlation coefficients Rx and Ry by the method described above. In the case of the sampling data shown in FIG. 12, when the correlation coefficients Rx and Ry are derived by setting the significant digits to two digits after the decimal point, the correlation coefficients Rx and Ry become Rx=0.47 and Ry=1.00, as shown in FIG. 13. The correlation coefficient takes a value from −1 to 1, and the closer to 1, the stronger the positive correlation. Therefore, when the correlation coefficient is equal to or greater than some threshold value "c," which is predetermined, the control unit 100 determines that the RSSI pattern matches the reference pattern and identifies the wireless tag with such a RSSI pattern as the target wireless tag. Then, the control unit 100 controls the wireless tag communication device 201 to write data to the identified target wireless tag. In the present embodiment, 0.8 is used as an example of the threshold value "c".

The correlation coefficient Rx between the reference pattern and the RSSI pattern of Tag X is 0.47 that is less than 0.8. On the other hand, the correlation coefficient Ry between the reference pattern and the RSSI pattern of Tag Y is 1.00 that is greater than 0.8. Therefore, the control unit 100 identifies Tag Y as the target wireless tag and controls the wireless tag communication device 201 to write data to Tag Y.

Figure 14:
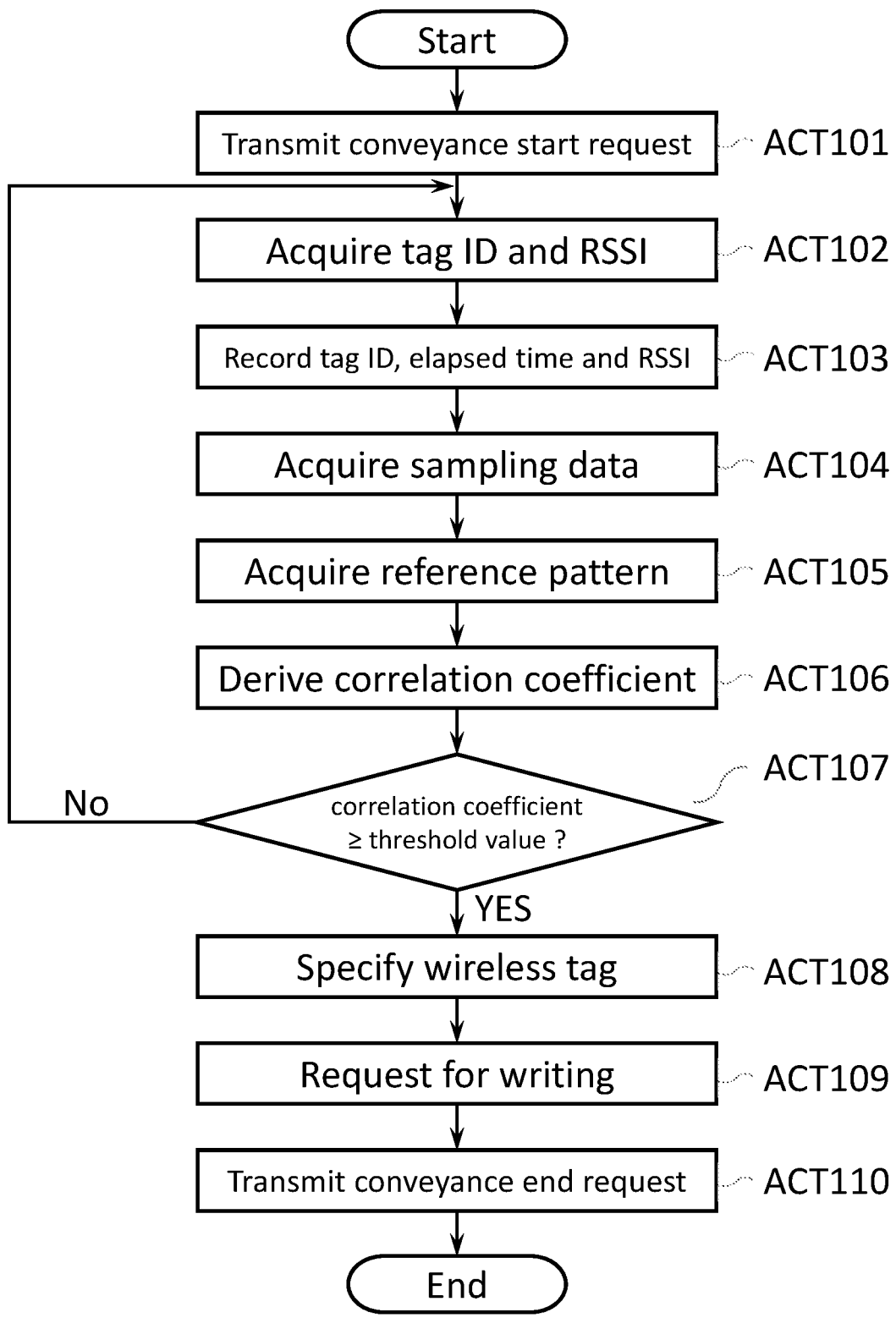
FIG. 14 is a flowchart of processes by a control unit according to an embodiment.

FIG. 14 is a flowchart of processes executed by the control unit 100 according to the present embodiment. The control unit 100 transmits a request for starting conveyance of a sheet (ACT101). The wireless tag communication device 201 then starts detection of the RSSI and the tag ID from the wireless tag on the sheet that is being conveyed along the conveyance path 533. When the RSSI and the tag ID are detected, the wireless tag communication device 201 transmits data including the detected RSSI and tag ID to the control unit 100.

The control unit 100 acquires such data from the wireless tag communication device 201 (ACT102). The control unit 100 records the acquired tag ID and RSSI as well as an elapsed time in the storage device 52 (ACT103). The elapsed time is a time elapsed from the start of detection of the RSSI and tag ID.

As shown in FIGS. 10 and 11, the control unit 100 acquires the sampling data for each wireless tag from the recorded tag ID, RSSI and elapsed time (ACT104). The control unit 100 acquires the reference patterns from the storage device 52 (ACT105). As shown in FIG. 13, the control unit 100 derives the correlation coefficient between the sampling data and the reference patterns for each wireless tag (ACT106). In ACT106, the control unit 100 does not derive a correlation coefficient for a wireless tag whose sampling data does not satisfy a predetermined condition.

The control unit 100 determines whether there is a wireless tag whose correlation coefficient is equal to or greater than the predetermined threshold value (ACT107). When there is no wireless tag whose correlation coefficient is equal to or greater than the threshold value (ACT107: NO), the control unit 100 returns to ACT102. When there is a wireless tag whose correlation coefficient is equal to or greater than the threshold value (ACT107: YES), the control unit 100 identifies such a wireless tag as the target wireless tag (ACT108). The control unit 100 transmits a write request for writing data to the identified target wireless tag to the wireless tag communication device 201 (ACT109). In this way, the control unit 100 controls the wireless tag communication device 201 so as to write information into the specified wireless tag. The control unit 100 transmits a request for stopping the sheet conveyance to the wireless tag communication device 201 (ACT 110) and ends the processing.

Referring back to ACT 106, the control unit 100 determines whether the predetermined condition is met by a wireless tag before it calculates the correlation coefficient. The predetermined condition is whether the number of sampling data is sufficient or not for the correlation coefficient calculation. If the sampling data have not been sufficiently obtained, the correlation coefficient cannot be calculated appropriately. The insufficient number of sampling data is, for example, less than the number of data of the reference patterns. In the example of FIG. 12, when the number of sampling data is less than 5, the control unit 100 determines that the number of sampling data is not sufficient and does not proceed with deriving the correlation coefficient for that wireless tag.

The control unit 100 may further determine whether there is data among the sampling data that has changed by at least a predetermined value from the value of the immediately preceding data. If there is no such data, the control unit 100 may not derive the correlation coefficient. This is because if the sampling data does not show a certain level of change, it is unlikely that the detected RSSI is from the wireless tag of the sheet being conveyed along an expected conveyance path, such as the conveyance path 533, in the image forming apparatus 10. Therefore, the control unit 100 may derive the correlation coefficient only when there is data that has changed by at least a certain value from the value of the immediately preceding data among the data detected after the start of detection. In this case, the control unit 100 sets the data obtained before and after the detection timing of the data with such a change as the sampling data based on which the correlation coefficient is to be calculated. For example, in a case where five pieces of sampling data are to be used for the correlation coefficient calculation, the control unit 100 identifies data showing the predetermined certain level of change as the second data and sets one piece of data before the second data and three pieces of data after the second data as the five pieces of sampling data in total.

In ACT106, when there are a plurality of wireless tags whose correlation coefficients are equal to or greater than the threshold value, the control unit 100 may select the wireless tag having the largest correlation coefficient as the wireless tag (target wireless tag) to be written or otherwise indicate an error in the tag processing. When there are a plurality of wireless tags having a correlation coefficient greater than or equal to the threshold value and more than one wireless tag shares has a value equal to the largest correlation coefficient, the control unit 100 may select any one of these wireless tags as the target wireless tag or otherwise indicate an error in the tag processing. The reason for indicating an error is that it normally unlikely that the sampling data of the wireless tag of a non-conveyed sheet will have a high correlation to the reference pattern. Therefore, when there is more than one wireless tag whose correlation coefficients are equal to or larger than the threshold value, there is a high possibility that an irregular situation occurs, for example, a plurality of sheets have been simultaneously conveyed in error, or a user holding a tagged sheet has passed through the vicinity of the image forming apparatus 10.

Figure 15:
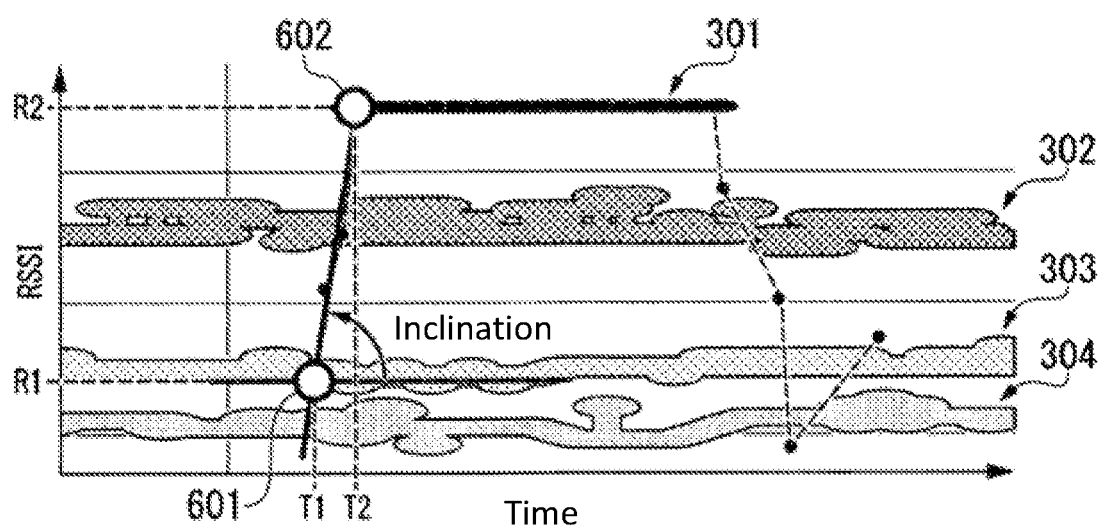
FIG. 15 depicts an example of a degree of similarity according to an embodiment.
Figure 16:
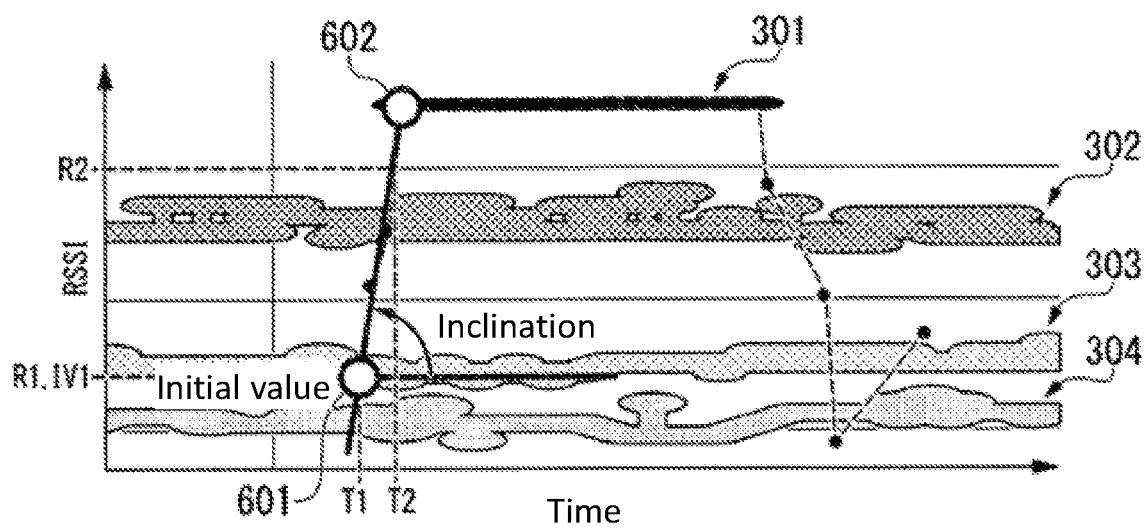
FIG. 16 depicts an example of a degree of similarity according to an embodiment.
Figure 17:
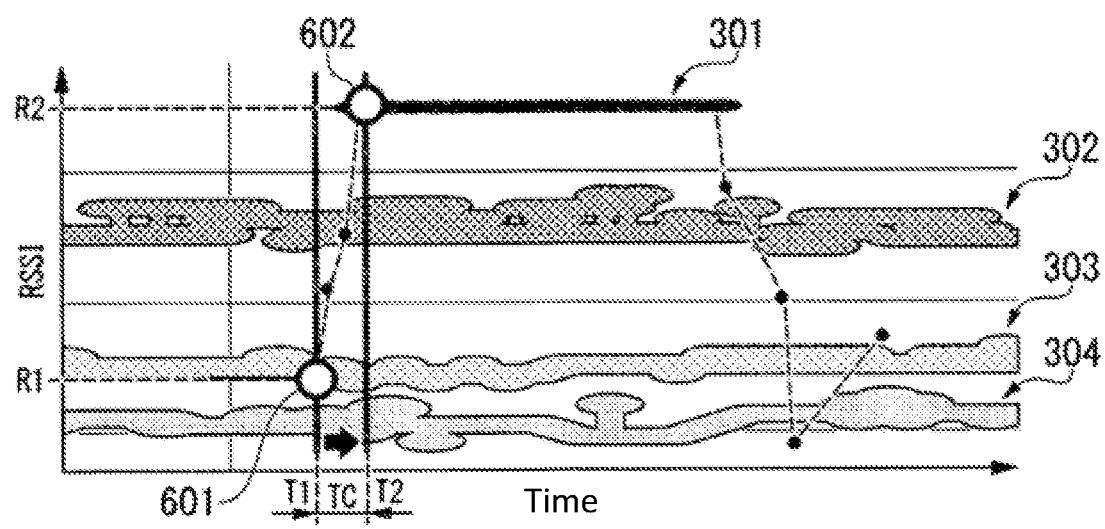
FIG. 17 depicts an example of a degree of similarity according to an embodiment.

As for the degree of similarity, there are other types than the one using the correlation coefficient. For example, the following degrees are applicable: (1) degree of similarity using an inclination; (2) degree of similarity using an initial value and an inclination; and (3) degree of similarity using an amount of change over a certain period of time. The inclination is an example of a rate of change. FIGS. 15, 16, and 17 show the RSSIs detected over time. The vertical axis represents RSSI, and the horizontal axis represents time. The detected RSSIs are plotted and connected by straight lines forming graphs 301, 302, 303, and 304. In the example, the graph 301 significantly changes up and down while the graphs 302, 303, and 304 substantially remain flat.

The graph 301 indicates the RSSI detected for one sheet on the conveyance path 533. The graph 302 indicates the RSSI detected from the sheet on the manual feeding tray 716. The graph 303 indicates the RSSI detected from the sheet on the sheet feeding cassette 516. The graph 304 indicates the RSSI detected from the sheet on the sheet feeding cassette 616.

Points 601 and 602 shown in each of FIGS. 15, 16, and 17 indicate two pieces of data among the sampling data. Each of the points 601 and 602 indicates that the detected RSSI changes by at least a predetermined value. The coordinates of the points 601 and 602 are indicated by (R1, T1) and (R2, T2), respectively.

As to "(1) degree of similarity using an inclination," a reference inclination M corresponding to the reference pattern in the correlation coefficient is stored in the storage device 52. A ratio M1/M between the reference inclination M and an inclination M1 obtained from the sampling data is defined as the degree of similarity in this example. When the degree of similarity is equal to or greater than a predetermined threshold value m, the control unit 100 determines that the inclination in the sampling data is similar to the reference inclination.

In the case of FIG. 15, M1=(R2−R1)/(T2−T1). Therefore, the control unit 100 identifies the target wireless tag when (R2−R1)/(T2−T1))/M≥m is satisfied. An example of the threshold value m is 0.8.

As to "(2) degree of similarity using an initial value and an inclination," the initial value is an example of the radio wave intensity at one timing. Also, the reference inclination M is stored in the storage device 52. Further, a reference initial value IV is stored in the storage device 52. A ratio AM (=M1/M) between the reference inclination M and the inclination M1 obtained from the sampling data as well as an absolute value A1 of a difference between the reference initial value IV and the initial value IV1 obtained from the sampling data are defined as the degree of similarity. When both AM≥m and A1≤T1 are satisfied, the control unit 100 determines that the inclination M1 and the initial value IV1 are similar to the reference inclination M and the reference initial value IV, respectively. T1 is a predetermined threshold value for determining whether or not the initial value IV1 is similar to the reference initial value IV. As an example of the threshold value T1, when the reference initial value IV is 60 dBm, the threshold value T1 is 3 dB. In this case, when the initial value IV1 is equal to or larger than 57 dBm and is 63 dBm, it is determined that the initial value IV1 is similar to the reference initial value IV.

In the case of FIG. 16, M1=(R2−R1)/(T2−T1). Therefore, AM=((R2−R1)/(T2−T1))/M. In addition, IV1=R1. Therefore, A1=|IV−R1|. The control unit 100 identifies the target wireless tag when both ((R2−R1)/(T2−T1))/M≥m and |IV−R1|≤T1 are satisfied.

As to "(3) degree of similarity using an amount of change over a certain period of time," a fixed time TC and a reference amount of change D are stored in the storage device 52. The ratio between the reference amount of change D and the amount of change obtained from the sampling data is defined as the degree of similarity. When the degree of similarity is equal to or greater than a predetermined threshold value v, the control unit 100 determines that the amount of change is similar to the reference amount of change.

In the case of FIG. 17, T2=T1+TC. That is, T2 is a time after a certain period of time has elapsed from T1. In this case, the amount of change is R2−R1. Therefore, the control unit 100 identifies the target wireless tag when (R2−R1)/D v is satisfied.

Any of the correlation coefficients and the degrees of similarity (1), (2), and (3) can be derived if the sampling data is available. Which of these degrees of similarities is to be used may be determined in accordance with specifications, environments, or the like of the image forming apparatus 10. In addition, the target wireless tag may be identified by any combination of the correlation coefficients and the degrees of similarity (1), (2), and (3).

Figure 18:
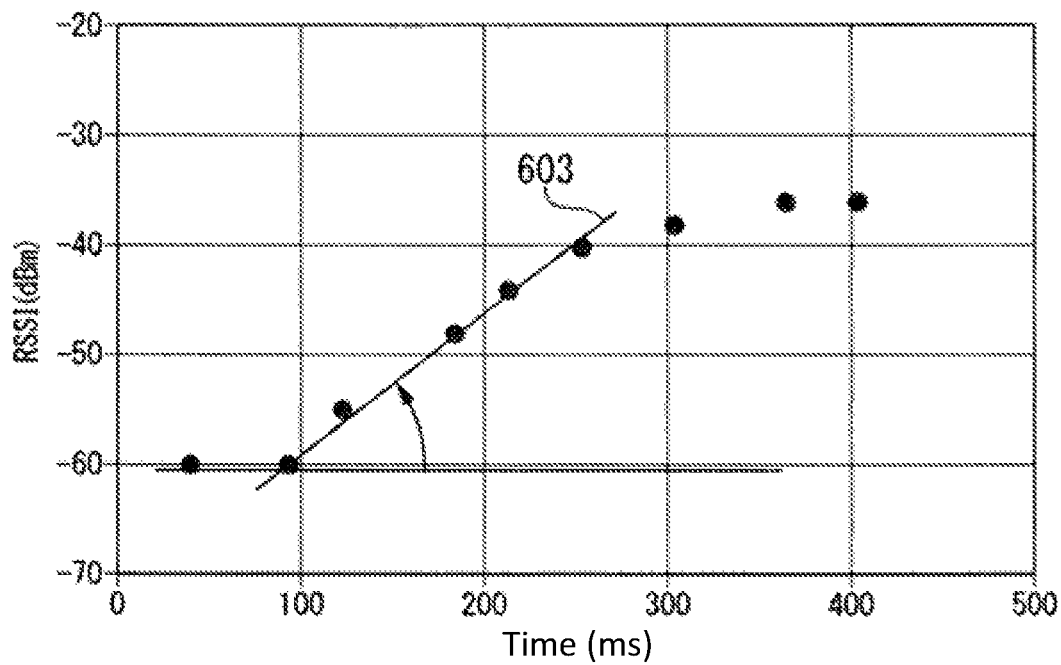
FIG. 18 is a graph showing an example of sampling according to an embodiment.

As a further detailed example of "(1) degree of similarity using the inclination," firstly, in order to acquire the reference inclination M, the control unit 100 acquires, from the wireless tag communication device 201, the RSSI sampled when the sheet is conveyed. FIG. 18 is a graph illustrating an example of the sampling. The sampling example shown in FIG. 18 is based on the data shown in FIG. 7. The vertical axis represents RSSI (unit: dBm), and the horizontal axis represents time (unit: millisecond). In the example, nine sampled RSSI values are plotted.

Among the data shown in FIG. 7, for example, the data at index 1 and index 5 are used to derive the reference inclination M. The reference inclination M is the slope of the straight line 603 in FIG. 18. When the index 1 and the index 5 are used, the reference inclination M is (−40−(−60))/(264−940.12. The reference inclination M is stored in the storage device 52. The threshold value m is, for example, 0.8.

The control unit 100 acquires, from the wireless tag communication device 201, the RSSI sampled when a sheet with a target wireless tag is conveyed.

The control unit 100 derives the inclination MX using, for example, the data at index 1 and index 5 among the sampling data of Tag X shown in FIG. 10. The inclination MX derived from the sampling data of Tag X is (−58−(−58))/(327−69)=0. The degree of similarity with the RSSI of Tag X is MX/M=0/0.12=0, which is less than 0.8.

The control unit 100 also derives the inclination MY using, for example, the data of index 1 and index 5 among the sampling data of Tag Y shown in FIG. 11. The inclination MY derived from the sampling data of Tag Y is (−38−(−58))/(368−1730.1. The degree of similarity with the RSSI of Tag Y is MX/M=0.1/0.12≈0.83, which is greater than 0.8. Therefore, the control unit 100 identifies Tag Y as the target wireless tag. Then, the control unit 100 controls the wireless tag communication device 201 to write information to Tag Y.

By using the correlation coefficient or any one of the degrees of similarity (1), (2), or (3) as the degree of similarity, the target wireless tag can be correctly identified. As a result, it is possible to prevent information from being erroneously written to a non-target wireless tag. Furthermore, since it is not necessary to provide a special conveyance path, such as a conveyance path that physically deforms the sheet, extra manufacturing costs or extra product costs do not occur. Further, since it is not necessary to provide a special conveyance path, the wireless tag communication device 201 can be provided or connected to a wide range of image forming apparatuses generally available where only firmware update may be necessary, and thus the present embodiment can be realized inexpensively and easily.

In the present embodiment, degrees of similarity can be derived with only five or so sampling events (e.g., measured RSSI values). This indicates that the wireless tag communication device 201 can identify the target wireless tag in a short period of time.

As to the degree of similarity using the inclination, the ratio M1/M between the reference inclination M and the obtained inclination M1 can be used as a degree of similarity, but instead of the ratio M1/M, for example, an absolute value of a difference between M and M1 may be used as the degree of similarity in some examples. In this case, the smaller the absolute value of the difference, the greater the similarity.

The functions of the image forming apparatus 10 in the present embodiments may be realized by a computer. In this case, a program for realizing the above-described functions and operations may be recorded in a non-transitory computer-readable recording medium, and the program recorded in the recording medium may be read and executed by a computer system. The "computer system" may include an operating system (OS) and auxiliary hardware such as peripheral devices. A "computer-readable recording medium" refers to a portable medium such as a flexible disk, a magneto-optical disk, or an ROM, a CD-ROM, or a storage device such as a hard disk incorporated in a computer system. Furthermore, the "computer-readable recording medium" may include a cloud-based or the like storage medium or device such as a server or the like. Further, the program may realize a part of the functions described above, or may realize the functions in combination with a program already recorded in the computer system.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device for an image forming apparatus, the control device comprising:
   a controller configured to:
      acquire reference information corresponding to expected signal strength values for a wireless tag on a sheet moving along a conveyance path;
      acquire, from a wireless tag communication device, measured signal strength values for a first wireless tag on a sheet;
      calculate a similarity value for the measured signal strength values and the expected signal strength values to determine whether the first wireless tag is on a sheet moving along the conveyance path; and
      control the wireless tag communication device to write information to the first wireless tag when the calculated similarity value is above a threshold similarity value.

2. The control device according to claim 1, wherein the controller is further configured to:
   calculate a correlation coefficient between a plurality of measured signal strength values for the first wireless tag and the expected signal strength values in the reference information as the similarity value.

3. The control device according to claim 1, wherein the reference information comprises a reference radio field intensity pattern, and
   the controller calculates a correlation coefficient between the measured signal strength values of the first wireless tag and the radio field intensity pattern as the similarity value.

4. The control device according to claim 1, wherein the controller is further configured to:
   calculate a first slope value from the measured signal strength values of the first wireless tag, and
   the similarity value is calculated based on a comparison between the first slope value and a reference slope value of the reference information.

5. The control device according to claim 4, wherein the controller is further configured to:
   calculate a ratio between the first slope value and the reference slope value as the similarity value.

6. The control device according to claim 4, wherein the controller is further configured to:
   calculate a difference between the first slope value and the reference slope value as the similarity value.

7. The control device according to claim 1, wherein the wireless tag is a radio frequency identification (RFID) tag.

8. The control device according to claim 1, wherein the measured signal strength values are received signal strength indicators.

9. The control device according to claim 1, wherein the controller is further configured to control a printer unit to form an image of the sheet on which the first tag is located.

10. The control device according to claim 1, wherein the controller is further configured to control movements of sheets along the conveyance path.

11. A wireless tag reader/writer for an image forming apparatus, the wireless tag reader/writer comprising:
    a wireless tag communication device configured to transmit signals to and receive signals from wireless tags; and
    a controller configured to:
      acquire, from the wireless tag communication device, a received signal strength for a wireless tag; and
      calculate similarity values between acquired received signal strength values for a plurality of wireless tags acquired over a period of time and reference information corresponding to expected received signal strength values for a target wireless tag;
      identify one of the plurality of wireless tags as the target wireless tag based on the calculated similarity value; and
      control the wireless tag communication device to write information to the identified one of the plurality of wireless tags when the calculated similarity value is above a threshold similarity value.

12. The wireless tag reader/writer according to claim 11, wherein the controller is further configured to:
    calculate a correlation coefficient between the expected received signal strength values in the reference information and the plurality of received signal strength values for each of the plurality of wireless tags as the similarity value.

13. The wireless tag reader/writer according to claim 11, wherein
    the reference information comprises a reference radio field intensity pattern, and
    the controller calculates a correlation coefficient between the radio field intensity pattern and the received signal strength values of each of the plurality of wireless tags and as the similarity value.

14. The wireless tag reader/writer according to claim 11, wherein
    the controller is further configured to:
      calculate a first slope value from the received signal strength values for each of the plurality of wireless tags, and
    the similarity value is calculated based on a comparison between the first slope value and a reference slope value of the reference information.

15. The wireless tag reader/writer according to claim 14, wherein the controller is further configured to:
    calculate a ratio between the first slope values and the reference slope value as the similarity value.

16. The wireless tag reader/writer according to claim 14, wherein the controller is further configured to:
    calculate a difference between the first slope values and the reference slope value as the similarity value.

17. An image forming apparatus, comprising:
    a conveyance unit configured to convey a sheet provided with a wireless tag;
    a wireless tag communication device configured to read and write data from and to the wireless tag;
    a reference information acquisition unit configured to acquire reference information; and
    a controller configured to derive a similarity value from the radio field intensity and the reference information to identify the wireless tag as a target wireless tag to which the data is to be written by the wireless tag communication device.

18. The image forming apparatus according to claim 17, wherein the controller is further configured to:
    calculate a reference radio field intensity from the reference information; and
    calculate a correlation coefficient between the radio field intensity and the reference radio field intensity as the similarity value.

19. The image forming apparatus according to claim 17, wherein the wireless tag is radio frequency identification (RFID) tag.

* * * * *